Feb. 20, 1962 R. O. CHAMBERS ETAL 3,021,729
PLANETARY TRANSMISSION FOR TRACTORS OR THE LIKE
Filed March 18, 1959

INVENTORS
ROBERT O. CHAMBERS
SETH P. NORDLING
CHARLES A. RAMSEL
BY
*Fryer and Johnson*
ATTORNEYS Feb. 20, 1962 R. O. CHAMBERS ET AL 3,021,729
PLANETARY TRANSMISSION FOR TRACTORS OR THE LIKE
Filed March 18, 1959 2 Sheets-Sheet 2

INVENTORS
ROBERT O. CHAMBERS
SETH P. NORDLING
CHARLES A. RAMSEL
BY
ATTORNEYS

United States Patent Office 3,021,729
Patented Feb. 20, 1962

3,021,729
PLANETARY TRANSMISSION FOR TRACTORS
OR THE LIKE
Robert O. Chambers, Elmwood, Seth P. Nordling, Washington, and Charles A. Ramsel, Peoria, Ill., assignors to Caterpillar Tractor Co., Peoria, Ill., a corporation of California
Filed Mar. 18, 1959, Ser. No. 800,286
10 Claims. (Cl. 74—768)

This invention relates to a planetary type transmission having three forward and three reverse speeds all selectable through actuation of stationary disc-type brakes which control rotation of ring gears in the planetary systems.

It is the object of the invention to provide a simple type transmission with low inertia loads which result from the rotation of heavy units such as large planet carriers, to provide a transmission with low unit loading of gear teeth in drives involving high torque transmission, and to provide large steps of driving ratios between different gear trains without the use of excessive gear sizes.

A further object is to provide a simple means of obtaining a direct power take-off drive through such a transmission.

Still further objects and advantages of the invention are made apparent in the following specification wherein reference is made to the accompanying drawings in which the principals of the invention are illustrated.

Figure 1:
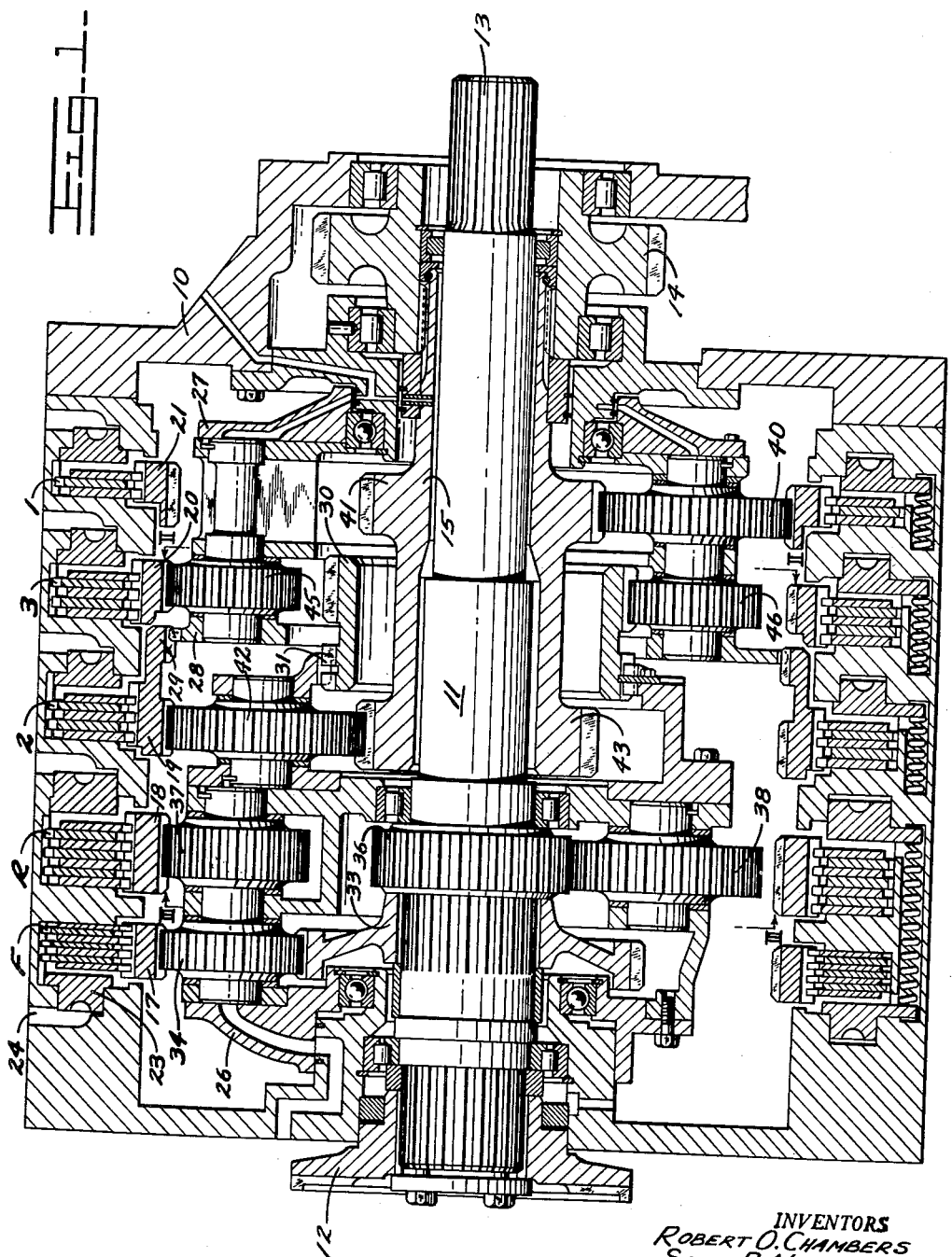
FIG. 1 is a schematic central longitudinal sectional view of a transmission embodying the present invention.

The transmission of the present invention is enclosed as shown in FIG. 1 in a housing 10 and includes a main shaft 11 extending centrally through said housing and having an input end 12 for connection with an engine or other source of power and an opposite end 13 providing a direct drive power take-off shaft for the operation of auxiliary equipment as is common practice in connection with tractors and the like. The main power output of the transmission is through a gear 14 splined against rotation on a hollow shaft 15 which surrounds and is rotatable with respect to the main shaft 11. The ratio of drive between the main shaft and the hollow shaft 15 is controlled by a plurality of epicyclic or planetary gear trains presently to be described.

Multiple disc brakes control the ring gears of the several planetary trains, there being five such brakes illustrated at F and R representing forward and reverse, respectively, and at 1, 2 and 3, representing first, second and third speed, respectively. All of the brakes are similar and of conventional multiple disc type with alternate discs connected or keyed as by splines to the housing and to the ring gears of the planetary trains, said gears being illustrated at 17 to 21, inclusive. The portions of the gears 17 to 21 which would appear in the background have purposely been omitted from the drawing for the sake of clarity. Each brake is provided with an annular piston, one for the brake F being shown for example at 23 adapted to be urged by fluid pressure introduced through a port 24 into contact with the brake discs to press them together and into engagement with the housing for stopping rotation of the respective ring gears and thus effecting operation of the planetary trains controlled by the ring gears.

Some of the advantages of the present invention result from the fact that the planetary trains controlled by brakes F, R, and 2 have a single carrier indicated at 26 rotatably mounted with respect to the housing and the main shaft 11 and carrying the planet and idler gears of the first three trains. A second similar carrier shown at 27, also rotatably mounted in the housing, carries the planet and idler gears for the trains controlled by the brakes 1 and 3 and this carrier 27 is connected for rotation with the ring gear 19 of the second speed brake by an externally toothed ring 28 fixed to the carrier and meshing with an internally toothed ring 29 formed integrally with the ring gear 19. The carrier 26 also has a splined connection with a floating sun gear 30 of the train controlled by brake 3 through intermeshing teeth or splines shown at 31.

In operation, forward or reverse drive is selected by application of either of the brakes F or R and by application of one of the brakes 1, 2 or 3, depending upon the speed or ratio desired. The forward gear train includes a sun gear 33 splined to the main shaft 11 and connected to the ring gear 17 through a plurality of planet gears 34 carried by the carrier 26. Therefore, upon application of the brake F, the ring gear is held against rotation causing the planets 34 to travel or walk around the internally toothed periphery of the ring gear imparting a drive in one direction to the carrier 26.

Figure 2:
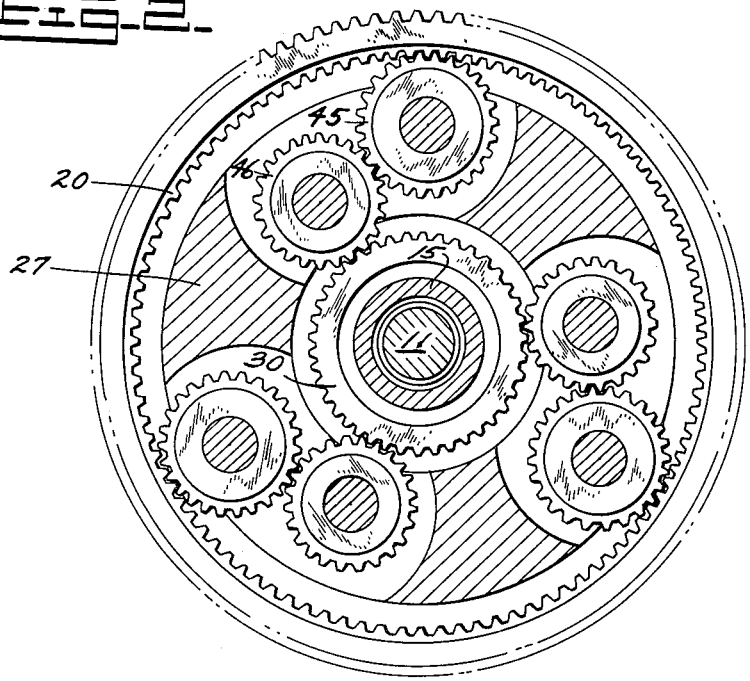
FIG. 2 is a sectional view taken on the line II—II of FIG. 1 illustrating the arrangement of an epicyclic gear train in the transmission.
Figure 3:
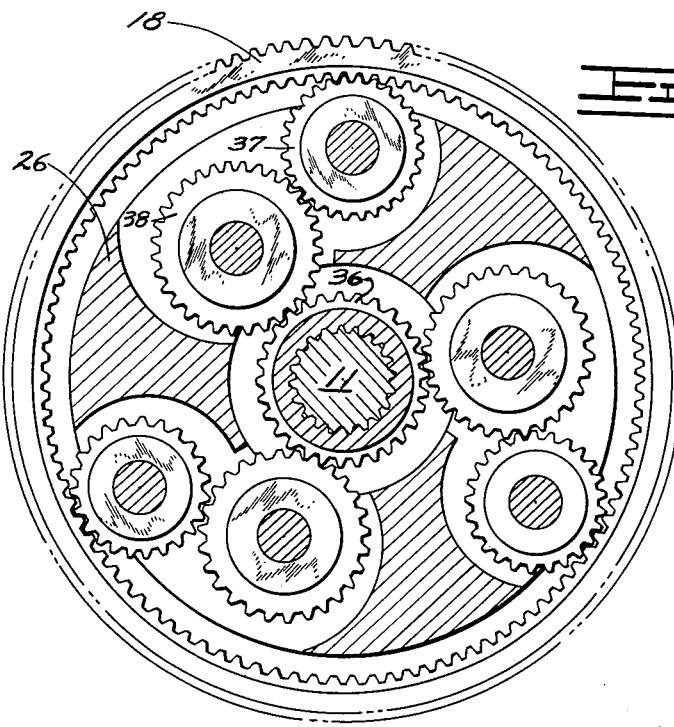
FIG. 3 is a similar view taken on the line III—III showing another of such trains.

For reverse drive, a sun gear 36 on the shaft 11 is connected to the ring gear 18 through planet gears 37 and idler gears 38, the arrangement of which are shown in FIG. 2 so that upon application of the brake R, the carrier 26 will be driven in the opposite direction.

For first or low speed operation in either forward or reverse and assuming that the forward or reverse brake has been applied, brake 1 is applied to hold ring gear 21 against rotation. Since the carrier 27 is being driven by its connection 28—29 with ring gear 19, planet gears 40 in the first speed gear train will walk around ring gear 21 and impart a drive to a sun gear 41 with which they mesh and which is formed integrally with the hollow output shaft 15. This provides a step-up in ratio to effect rotation of the output shaft 15 at a speed greater than that of carrier 26. However carrier 26 rotates at a speed greater than that of ring 19 so that planets 42 in the third speed gear train walk around ring 19 and direct a portion of the drive to the output shaft through a second sun gear 43 thereon. In this manner, the drive is divided through two gear trains including the sun gear 41 and the sun gear 43 greatly reducing the gear load stresses which are naturally highest during low speed, high torque operation.

For second speed operation, brake 2 is actuated to hold ring gear 19 against rotation. Since carrier 26 is rotating, planet gears 42 carried by it are compelled to walk around ring gear 19 and in so doing, impart a drive through sun gear 43 and shaft 15.

For third or high-speed operation, brake 3 is applied to hold ring gear 20 against rotation. This ring gear is connected to the floating sun gear 30 by planets 45 and idler gears 46, the arrangement of which is shown in FIG. 2. Since the floating sun gear 30 is driven through its connection 31 with the carrier 26, the idler gears 46 cause the planets 45 to walk around the now stationary ring gear 20 thereby imparting drive to the carrier 27 and the ring gear 19 to which it is connected. The idler gears 46 effect a reversal of drive and the ring 19 will be driven in a direction opposite to that of the carrier 26. This drive provides an additional step-up to the sun gear 43 and output shaft 15.

We claim:

1. A power transmission comprising a first rotatable planet carrier, a power input member driving said first planet carrier, an output shaft, a first sun gear on said output shaft, first planet gear means on said first carrier for driving said first sun gear, a rotatable ring gear engaging said first planet gear means, a second planet carrier connected to said rotatable ring gear to rotate therewith, a second sun gear on said output shaft, second planet means on said second planet carrier for driving said second sun gear, a second ring gear engageable by said second planet means, and low speed high power brake means selectively engageable to hold said second ring gear against rotation thereby to produce rotation of said second planet carrier and said rotatable ring gear in the same direction as said first planet carrier so that said first and second planet gear means drive said first and second sun gears, respectively.

2. The power transmission defined in claim 1 including a third planetary gear set on said second planet carrier operative when activated to rotate said second planet carrier and said rotatable ring gear in the direction opposite to that of said first planet carrier for high speed low power driving of said first sun gear.

3. A planetary type power transmission comprising an input shaft and an output shaft, a forward planetary gear train and a reverse planetary gear train each having sun, pinion and ring gears in meshing engagement, means to effect selective driving of said forward and reverse trains by the input shaft, a first carrier for both said trains, first, second and third gear trains each having sun, pinion and ring gears in meshing engagement, means to effect selective driving of the output shaft through said first, second and third gear trains, and a second carrier for two of said three trains, the third being carried on the first carrier.

4. A planetary type power transmission comprising an input shaft and an output shaft, a forward planetary gear train and a reverse planetary gear train each having sun, pinion and ring gears in meshing engagement, means to effect selective driving of said forward and reverse trains by the input shaft, a first carrier for said trains, first, second and third gear trains each having sun, pinion and ring gears in meshing engagement, means to effect selective driving of the output shaft through said first, second and third gear trains, a second carrier for two of said three trains, the third being carried on the first carrier, the sun gears of two of said three trains being fixed relative to the output shaft, and the third of said three trains having a driving connection between its sun gear and said first carrier.

5. A planetary type power transmission comprising an input shaft and an output shaft, a forward planetary gear train and a reverse planetary gear train each having sun, pinion and ring gears in meshing engagement, means to effect selective driving of said forward and reverse trains by the input shaft, a first carrier for said trains, first, second and third gear trains each having sun, pinion and ring gears in meshing engagement, means to effect selective driving of the output shaft through said first, second and third gear trains, a second carrier for two of said three trains, the third being carried on the first carrier, and means on the second carrier forming a driving connection with the ring gear of said third train.

6. A planetary type power transmission comprising an input shaft and an output shaft, a forward planetary gear train and a reverse planetary gear train each having sun, pinion and ring gears in meshing engagement, means to effect selective driving of said forward and reverse trains by the input shaft, a first carrier for said trains, first, second and third gear trains each having sun, pinion and ring gears in meshing engagement, means to effect selective driving of the output shaft through said first, second and third gear trains, a second carrier for two of said three trains, the third being carried on the first carrier, and means on the second carrier forming a driving connection with the ring gear of said third gear train, the sun gears of two of said three trains being on the output shaft, and another of said three trains including a sun gear driven by said first carrier.

7. A power transmission comprising a rotatable driving planet carrier, a power input member driving said carrier, a first driving planet on said driving carrier, a rotatable second planet carrier, a second driving planet on said second carrier, an output shaft, first and second sun gears on said output shaft engaged and adapted to be driven by said first and second planets respectively, a first ring gear rotatable with said second carrier engaged by said first planet, a rotatable second ring gear engaged by said second planet, moderate speed brake means selectively engageable to restrain said first ring gear against rotation and cause said first planet to roll therearound and impart rotation to said first sun, and low speed brake means selectively engageable to lock said second ring gear against rotation to cause said second planet to roll therearound thereby to cause said second carrier and said first ring gear to rotate together so that said first and second planets drive said first and second sun gears respectively under heavy torque load.

8. The transmission defined in claim 7 including a third sun gear carried on said first carrier to rotate coaxially therewith, a reversing planet gear train on said second carrier engaging said sun gear, a rotatable third ring gear engaged by said reversing gear train, and high speed brake means selectively engageable to restrain said third ring gear against rotation and cause said third sun gear to drive said reversing gear train and cause said second carrier and said first ring gear to rotate in a direction opposite to the direction of rotation of said first carrier.

9. The transmission defined in claim 7 including forward and reverse planetary gear trains and means for selectively connecting one of said gear trains to said power input member to control the direction of rotation of said driving carrier.

10. A power transmission comprising a rotatable planet carrier, a power input member driving said carrier, an output shaft, a sun gear on said output shaft, planet gear means on said carrier for driving said sun gear, a rotatable ring gear engaging said planet gear means, means for retarding said ring gear but permitting rotation thereof slower than said carrier in the same direction for low speed high power transmission, means for holding said ring gear against rotation for moderate high speed moderate power transmission, means for rotating said ring gear in the direction opposite said carrier for high speed low power transmission, forward and reverse planetary gear trains, and means for directing power selectively through one of said gear trains to control the direction of rotation of said driving carrier.

(References on following page)

References Cited in the file of this patent

UNITED STATES PATENTS

| | | |
|---|---|---|
| 2,170,444 | Barbarou | Aug. 22, 1939 |
| 2,505,713 | Lucia | Apr. 25, 1950 |
| 2,597,357 | McCormick | May 20, 1952 |
| 2,609,706 | Jandasek | Sept. 9, 1952 |
| 2,673,475 | Ebsworth | Mar. 30, 1954 |
| 2,717,524 | Davis | Sept. 13, 1955 |
| 2,793,533 | Swenson et al. | May 28, 1957 |
| 2,890,603 | Harris et al. | June 16, 1959 |
| 2,926,543 | Holdeman et al. | Mar. 1, 1960 |